(12) United States Patent (10) Patent No.: US 8,842,791 B2
Chari (45) Date of Patent: Sep. 23, 2014

(54) SYNCHRONIZATION OF A RECEIVER TO A DESIRED SIGNAL

(75) Inventor: Sujai Chari, Burlingame, CA (US)

(73) Assignee: Posedge Inc., Sunnyvale, CA (US)

( * ) Notice: Subject to any disclaimer, the term of this patent is extended or adjusted under 35 U.S.C. 154(b) by 246 days.

(21) Appl. No.: 13/209,376

(22) Filed: Aug. 13, 2011

(65) Prior Publication Data

US 2013/0039404 A1 Feb. 14, 2013

(51) Int. Cl.
*H04L 7/00* (2006.01)
*H04J 11/00* (2006.01)
*H04B 1/10* (2006.01)
*H04L 25/03* (2006.01)
*H04L 27/26* (2006.01)

(52) U.S. Cl.
CPC .......... *H04B 1/1036* (2013.01); *H04J 11/0023* (2013.01); *H04B 1/109* (2013.01); *H04L 7/0083* (2013.01); *H04L 25/03* (2013.01); *H04L 27/2601* (2013.01)
USPC ........... 375/354; 375/316; 375/344; 375/346; 375/350; 455/296

(58) Field of Classification Search
USPC ........... 375/316, 344, 346, 350, 354; 455/296
See application file for complete search history.

(56) References Cited

U.S. PATENT DOCUMENTS

| 7,016,436 | B1 * | 3/2006 | Molnar ........................ 375/346 |
| 2002/0006159 | A1 | 1/2002 | Wagner et al. |
| 2006/0067442 | A1 | 3/2006 | Tanaka |
| 2007/0211641 | A1 | 9/2007 | Fu et al. |
| 2008/0075208 | A1 * | 3/2008 | Li et al. ........................ 375/347 |
| 2009/0135792 | A1 | 5/2009 | Gonikberg |
| 2009/0245438 | A1 * | 10/2009 | Oredsson et al. ............. 375/345 |
| 2011/0285909 | A1 * | 11/2011 | Choi ............................. 348/607 |

* cited by examiner

*Primary Examiner* — Leila Malek

(74) *Attorney, Agent, or Firm* — Brian R. Short

(57) ABSTRACT

Apparatuses, methods and systems of synchronizing a receiver to a desired signal are disclosed. One method includes obtaining synchronization information of an interfering signal, and adjusting an out-of-band response of a receiver filter based at least in part on the synchronization information of the interfering signal, wherein the in-band response of the receiver filter is determined by frequency components of the desired signal.

6 Claims, 12 Drawing Sheets

Obtaining synchronization information of an interfering signal

710

Adjusting an out-of-band response of a receiver filter based at least in part on the synchronization information of the interfering signal, wherein the in-band response of the receiver filter is determined by frequency components of the desired signal

720

SYNCHRONIZATION OF A RECEIVER TO A DESIRED SIGNAL

FIELD OF THE DESCRIBED EMBODIMENTS

The described embodiments relate generally to wireless communications. More particularly, the described embodiments relate to methods and apparatuses for enhancing synchronization of a receiver to desired signals.

BACKGROUND

Wireless systems typically include a receiver synchronizing to a desired signal, and receiving information from the desired signal. In some situations, the transmitter of the desired signal is proximate to other transmitters that transmit signals that interfere with the desired signal, and can be considered as noise and/or interference.

Interference can impair a receiver's ability to properly detect the start of a packet of information of the desired signal. Specifically, the receiver can synchronize to an interfering signal or noise (referred to as a "false" synchronization) which can result in missed detection of the desired signal. This is particularly probable when the interfering signals and the desired signals are transmitted overlapping in time. Additionally, the interference can degrade the synchronization properties of the desired signal, thereby inhibiting the receiver from detecting the desired signal.

In many wireless systems, the interference signals from adjacent channels or even nearby (in frequency) can impair the receiver's ability to synchronize to the desired signal. A proposed solution includes attempting to filter out of band interference using low pass filters. Therefore, when the receiver samples the signal at the desired sampling rate, the aliasing component of the interference signals can be reduced. However, there are practical limitations on the ability of the receiver low pass filters to reject the out of band interference. First the interference is typically not adequately suppressed, or the low pass filtering degrades the overall decoding of the desired signal by introducing extensive inter-symbol interference which degrades the signal quality of the desired signal.

It is desirable to have methods and apparatuses for enhancing synchronization to a desired signal.

SUMMARY

An embodiment includes a method of synchronizing a receiver to a desired signal. The method includes obtaining synchronization information of an interfering signal, and adjusting an out-of-band response of a receiver filter based at least in part on the synchronization information of the interfering signal, wherein the in-band response of the receiver filter is determined by frequency components of the desired signal.

Another embodiment includes a method of synchronizing a receiver to a desired signal. The method includes obtaining synchronization information of an interfering signal, and selecting out-of-band filtering of a receiver filter to include greater dispersion of the interfering signal than the desired signal during a synchronization period of the interfering signal.

Another embodiment includes a receiver. The receiver includes a controller, wherein the controller obtains synchronization information of an interfering signal. The receiver further includes a front-end receiver chain that includes a receiver filter. The controller and the front-end receiver chain are operative to adjust an out-of-band response of the receiver filter based at least in part on the synchronization information of the interfering signal, wherein the in-band response of the receiver filter is determined by frequency components of the desired signal.

Another embodiment includes a method of a transmitter mitigating its interference of a desired signal. The method includes obtaining synchronization information of the desired signal, and adjusting an out-of-band response of a transmitter filter based at least in part on the synchronization information of the desired signal.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods and apparatuses improving a receiver's ability to detect and synchronize to a desired receive signal packet in the presence of interfering signals. Embodiments include estimating characteristics and traits of the interference, and adjusting the synchronization based on the characteristics and traits of the interference. The embodiments reduce the likelihood of falsely synchronizing the receiver to the interfering signal(s) rather than the desired signal (signal of interest (SOI)), thereby reducing the impact of the interfering signal(s) on the receiver ability to detect the desired signal.

In wireless local area networks (WLAN) and other wireless systems, adjacent/alternate channel interference can significantly impair reception of the desired signal of interest (SOI). The interferer (signal) can often be much closer in distance (and often line-of-sight (LOS)) to the receiver that the transmitter of the desired signal. Embodiments of receivers use a combination of radio frequency (RF) band pass and analog/digital low pass filters to suppress the interference, thereby minimizing the impact of the signal-to-interference-plus-noise-ratio (SINR) to allow proper decoding of the received desired signal. If the average SINR of the received desired signal is above a threshold value for a particular signal modulation, then an adequate packet error rate (PER) of the desired SOI can be achieved at the receiver.

In order to achieve proper demodulation/decoding of the desired signal, accurate packet synchronization needs to be achieved. For orthogonal frequency division multiplexing (OFDM) signals, this process involves determination of the OFDM symbol boundary and ascertaining the start of a preamble and data in a particular packet. Unlike demodulation/decoding, synchronization performance is not necessarily correlated with SINR. Other signal characteristics should be considered to effectively increase interference immunity during synchronization.

Figure 1:
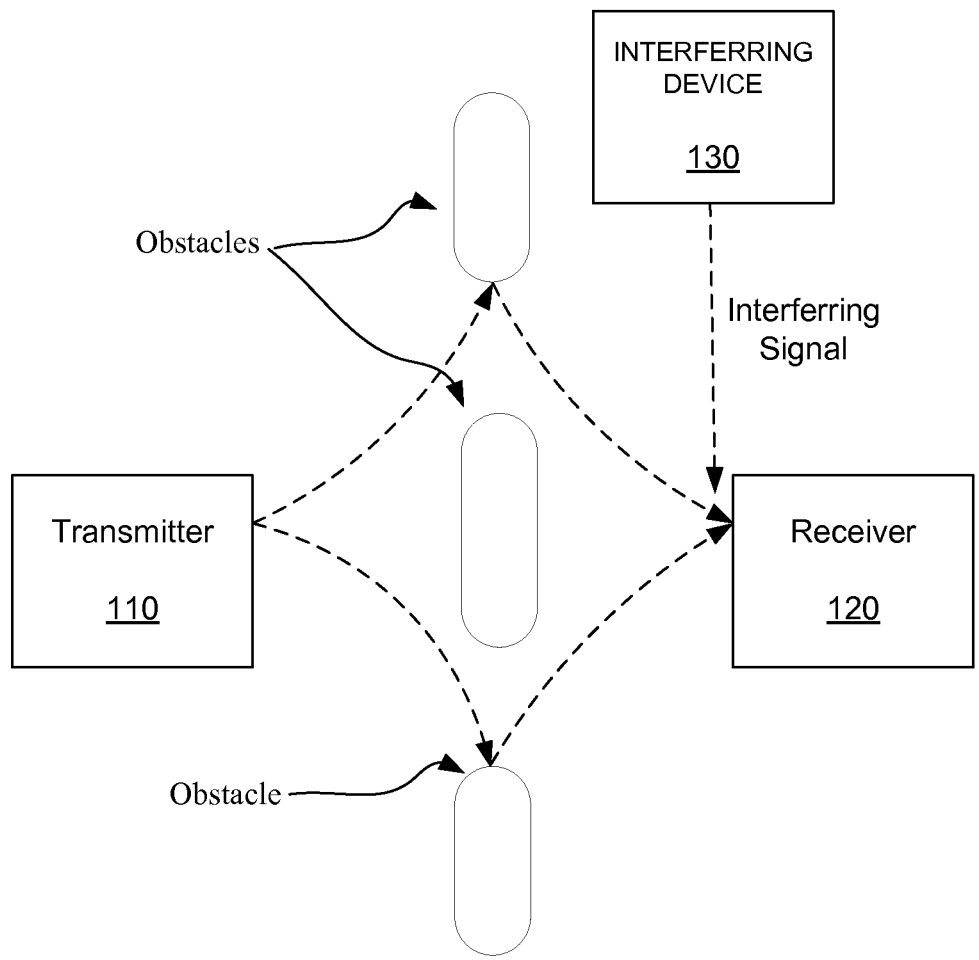
FIG. 1 shows an example of a receiver that receives signals from a desired transmitter, and signals from interfering transmitters.

FIG. 1 shows an example of a receiver 120 that receives signals from a desired transmitter 110, and signals from an interfering transmitter 130. As shown, the desired signal transmitted from the desired transmitter 110 does not have a direct line of sight to the receiver 120 due to the presence of obstacles located directly between the desired transmitter 110 and the receiver 120. Therefore, the desired signal can be attenuated and dispersed by the time the desired signal is received by the receiver 120. Additionally, the interfering transmitter 130 may be both physically closer to the receiver 120, and have a direct line of sight. Thus, the interfering signal power observed at the receiver can be considerably less attenuated and dispersed relative to the desired signal.

As a result, even if transmitted over different transmission channels, the interfering signal can inhibit the ability of the receiver to properly synchronize to the desired transmission signal. Receivers typically include low pass filtering of received signals before down-sampling. The sampling rate being equivalent to the desired signal bandwidth can cause aliasing of remnant interference signal components. Stronger interference signal power results in stronger in band aliased interference signal components.

In order to achieve packet and symbol synchronization for OFDM signals, the receiver typically correlates the received baseband signal with at least a portion of a known preamble sequence (that precedes the payload portion of the packet) transmitted by the transmitter. The correlation power is subsequently normalized by the power of the received signal and compared against a threshold. If a correlation power value at a particular sample exceeds the threshold, sync is detected and the symbol boundary can be determined. The equations below describe the computations involved.

Received signal:

$$y_k = \sum_{i=0}^{M-1} x_{k-i} h_i + n_k$$

Cross Correlation:

$$R_{xy} = \sum_{i=0}^{N-1} y_{k+i} s_i^*$$

Signal Power:

$$P_y = \sum_{i=0}^{N-1} y_{k+i} y_{k+i}^*$$

Threshold Check:

$$\frac{|R_{xy}|^2}{P_y} > \gamma$$

where $y_k$ is the received signal at time index k,
$x_k$ is the transmitted signal at time index k,
$h_{0 \ldots M-1}$ is a length M sequence representing the wireless channel impulse response,
$n_k$ is the noise sample at time index k,
$s_{0 \ldots N-1}$ is a length N sequence which represents some subset of the known preamble,
$R_{xy}$, is the cross correlation between the received signal and known preamble,
$P_y$ is the power of the received signal over the length of the correlation
$\gamma$ is a threshold used for comparing the against the normalized correlation The threshold used for the comparison above must be chosen to trade off false synchronization versus missed detection. If the threshold is chosen to be too low, then there is an increased likelihood to declare synchronization in noise/interference. If the rate of this false sync is high, then the desired signal may be missed during the time required before the receiver determines that there was no reliable packet and resumes the search for a new sync. Conversely, if the threshold is too high, the likelihood of false sync is minimized but there is a higher likelihood of the desired packet being missed since the normalized correlation can be lowered by noise/interference.

Figure 2A:
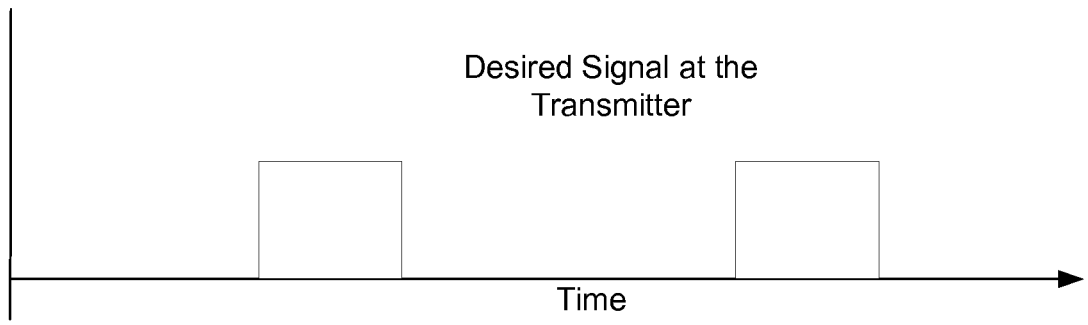
FIGS. 2A and 2B are time lines that show a representation of a desired signal at a transmitter, and the desired signal at a receiver.
Figure 2B:
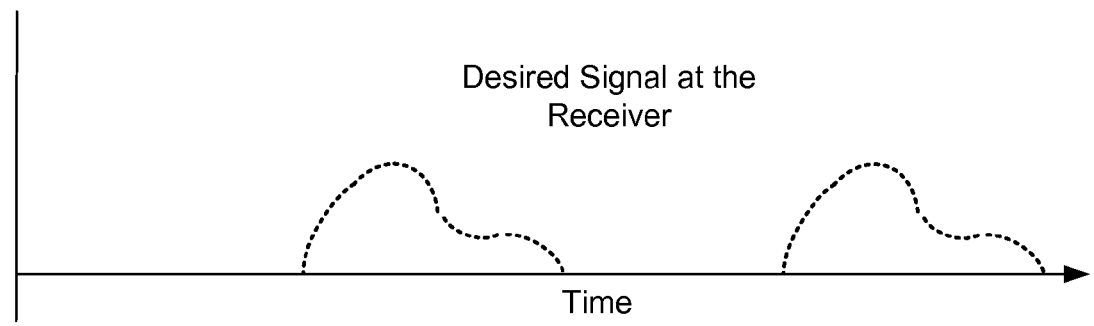

FIGS. 2A and 2B are time lines that show a representation of a desired signal at a transmitter, and the desired signal at a receiver. As shown, the desired signal can suffer from both attenuation and dispersion when traveling through the transmission path between the transmitter and the receiver. Both of these types of signal distortion can reduce the receiver's ability to effectively synchronize to the desired signal, particularly in the presence of interfering signals.

Ideally, when a receiver is attempting to receive a desired signal on a particular channel, false sync to adjacent channel interference signals should not occur. As mentioned previously, if such a false sync rate is too high, then the desired signal may not be detected (and hence not decoded) if the desired and interfering signals overlap in time. If both signals have a high duty cycle, then overlap in time is inevitable. There are several approaches that can be used to mitigate the impact of interference signals on the synchronization of desired signals as will be discussed.

Synchronization Sequence Cross-Correlation

Systems are often designed such that the preamble synchronization sequences not only exhibit good autocorrelation properties but also the cross-correlation among such sequences transmitted on different channels is quite low (that is, considerably lower than the autocorrelation). For reasonable length synchronization sequences, cross-correlation suppression of at least 10 dB may be achieved. Thus, the likelihood of the correlation peak of a received adjacent channel interference signal with the sync sequence of the desired signal exceeding the pre-determined threshold is considerably lowered.

However, systems implementing standards such as 802.11a/b/g/n only use one synchronization sequence for all channels. Therefore, there is no cross-correlation suppression to reduce the likelihood of false synchronization.

Interference to Noise Ratio (INR)

If the interference signal power to noise power (INR) is very low, then the likelihood of detecting a correlation peak that exceeds the threshold as shown in Threshold Check:

$$\frac{|R_{xy}|^2}{P_y} > \gamma$$

is quite low even if the sync sequence used by the interference channel is the same as that of the desired signal (i.e. no cross-correlation suppression case as mentioned in previous section). The reason for the low probability of detection is that the noise power is large enough to reduce the coherent gains typically observed during correlation of received data with the known transmitted preamble sequence. However, in typical use of wireless systems such as WLAN, the interferer may be quite close in proximity to the receiver of the desired signal. Hence, the INR will be quite high and noise cannot be relied upon to reduce the likelihood of false sync. Methods of determining an interference noise ratio (INR) target of the desired signal, and adjusting the receiver filter to achieve the INR target will be described. A specific embodiment is described and shown in FIG. 11.

Channel Dispersion Ratio

If Received signal:

$$y_k = \sum_{i=0}^{M-1} x_{k-i} h_i + n_k$$

Cross Correlation:

$$R_{xy} = \sum_{i=0}^{N-1} y_{k+i} s_i^*$$

are examined for the noiseless case (i.e. $n_k=0$), then it becomes evident the correlation peak is reduced due to channel dispersion. Specifically, the correlation peak is limited by the maximum tap of the impulse response, $h_k$. Thus, for an LOS channel without much channel dispersion, the magnitude of the maximum tap is quite high resulting in minimal correlation peak reduction. Conversely, for an NLOS channel, the maximum tap is lower relative to the overall channel impulse response power and the correlation peak will be substantially reduced.

Ideally, if the desired signal encounters an LOS channel and the interference signal's channel response to the receiver can be modeled as an NLOS channel, the desired signal's correlation peak will not be reduced significantly whereas the correlation peak for the interference signal will be substantially reduced. However, it is not uncommon to have the interference transmitter in close proximity to the receiver of the desired signal resulting in an LOS channel for the interference signal. Additionally, there are many applications where the transmission of the desired signal traverses multiple walls resulting in a highly dispersive channel which substantially reduces the sync correlation peak. Hence, the channel dispersion ratio cannot be relied upon to aid in reduction of false sync detection.

Methods of providing a filter that provides an increase the dispersion of the synchronization components of the interfering signal received by the receiver will be described. A specific embodiment will be described and shown in FIG. 12.

Figure 3:
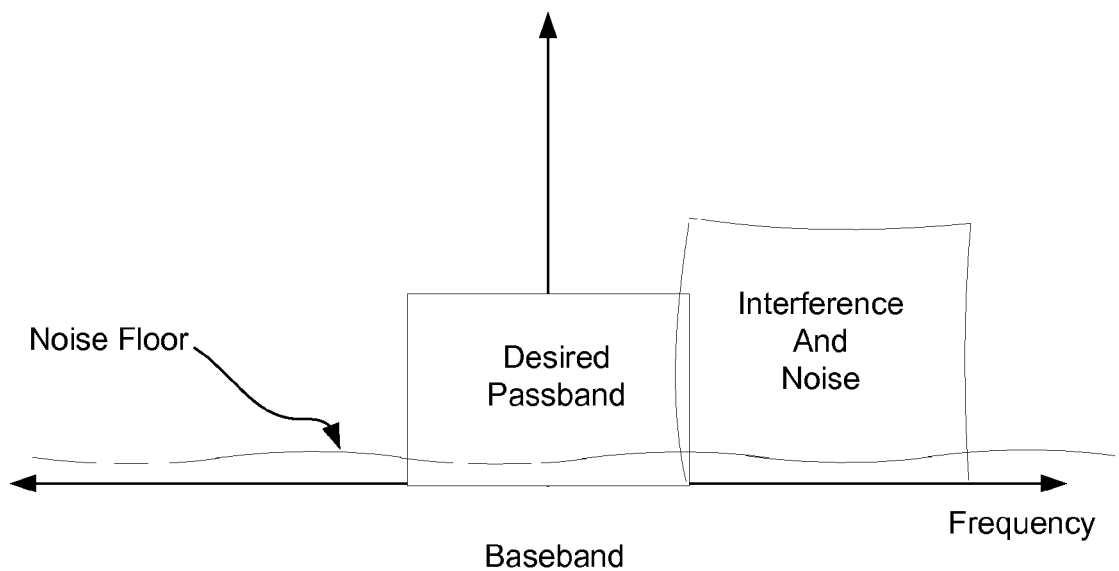
FIG. 3 shows a base band frequency spectrum and an example of a desired signal pass band that is adjacent to an interfering signal pass band.

FIG. 3 shows a baseband frequency spectrum and an example of a desired signal pass band that is adjacent to an interfering signal pass band. The point of FIG. 3 is to illustrate that the pass band of desired signal may be different than the interfering signal. However, in operation, the processing of the received signal is typically performed at the baseband, and signal components of the interfering signal can bleed over into the pass band of the desired signal.

There are several possible techniques to counter the issues related to INR and dispersion. One technique includes aligning peaks/valleys of out-of-band filter response to suppress sync components of interfering signal which lowers INR. Another technique includes modifying a receiver filter to increase group delay in the out-of-band response of the receiver filter to create more dispersion for aliased interference components, thereby reducing correlation peak. Both of these techniques will be described in greater detail.

Figure 4A:
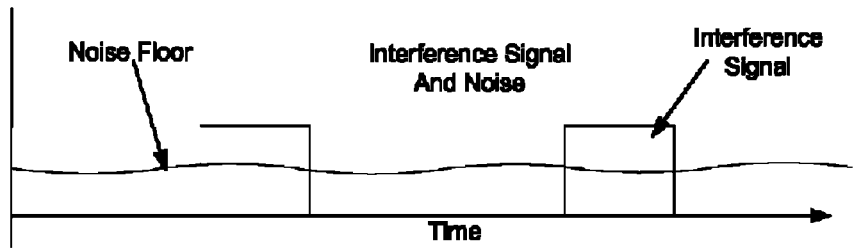
FIGS. 4A, 4B, 4C are time lines that show a representation of an interfering signal, and the interfering signal after out-of-band filtering, and after dispersion filtering.
Figure 4B:
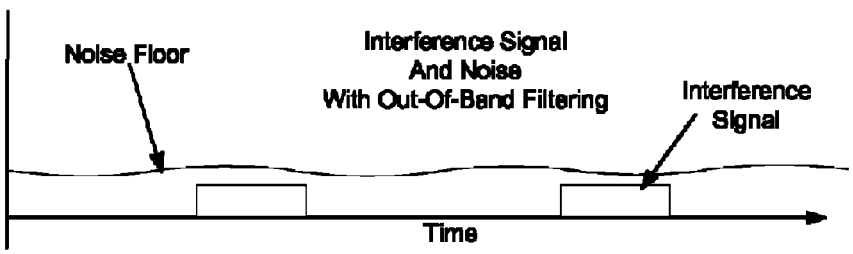
Figure 4C:
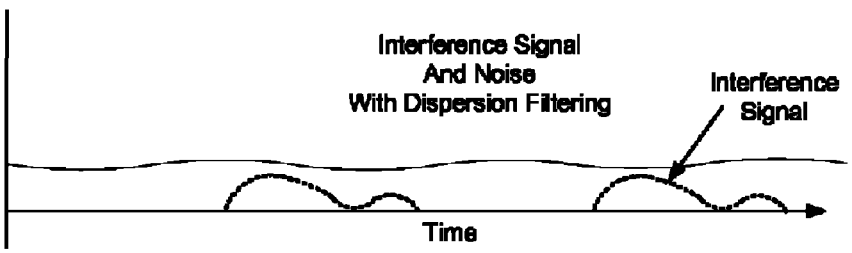

FIGS. 4A, 4B, 4C are time lines that show a representation of an interfering signal, and the interfering signal after out-of-band filtering, and after dispersion filtering. These Figures illustrate the effects that at least some of the described embodiments for enhancing a receiver's ability to synchronize to a desired signal can have on an interfering signal.

FIG. 4A shows an example of a representation of an interfering signal before receiver processing. The interfering signal has a signal amplitude greater than a noise floor, and therefore, influences the SINR of the desired signal at the receiver.

FIG. 4B shows an example of the effects the described embodiments that include adjusting an out-of-band filtering (adjusting the locations of peaks and valleys of the out-of-band frequency response) has on the received interfering signal. As shown, the signal amplitude of the interfering signal is attenuated to be below the noise floor. Therefore, the interferer's sync frequency components being below the noise (i.e. very low INR) reduces the likelihood of false synchronization because correlation peaks most likely so not exceed a problem threshold.

FIG. 4C shows an example of the effects the described embodiments that include adjusting receiver filter dispersion has on the received interfering signal. As shown, the signal amplitude of the interfering signal is attenuated to be below the noise floor. Therefore, the interfering signal no longer influences the SINR of the received desired signal.

Figure 5:
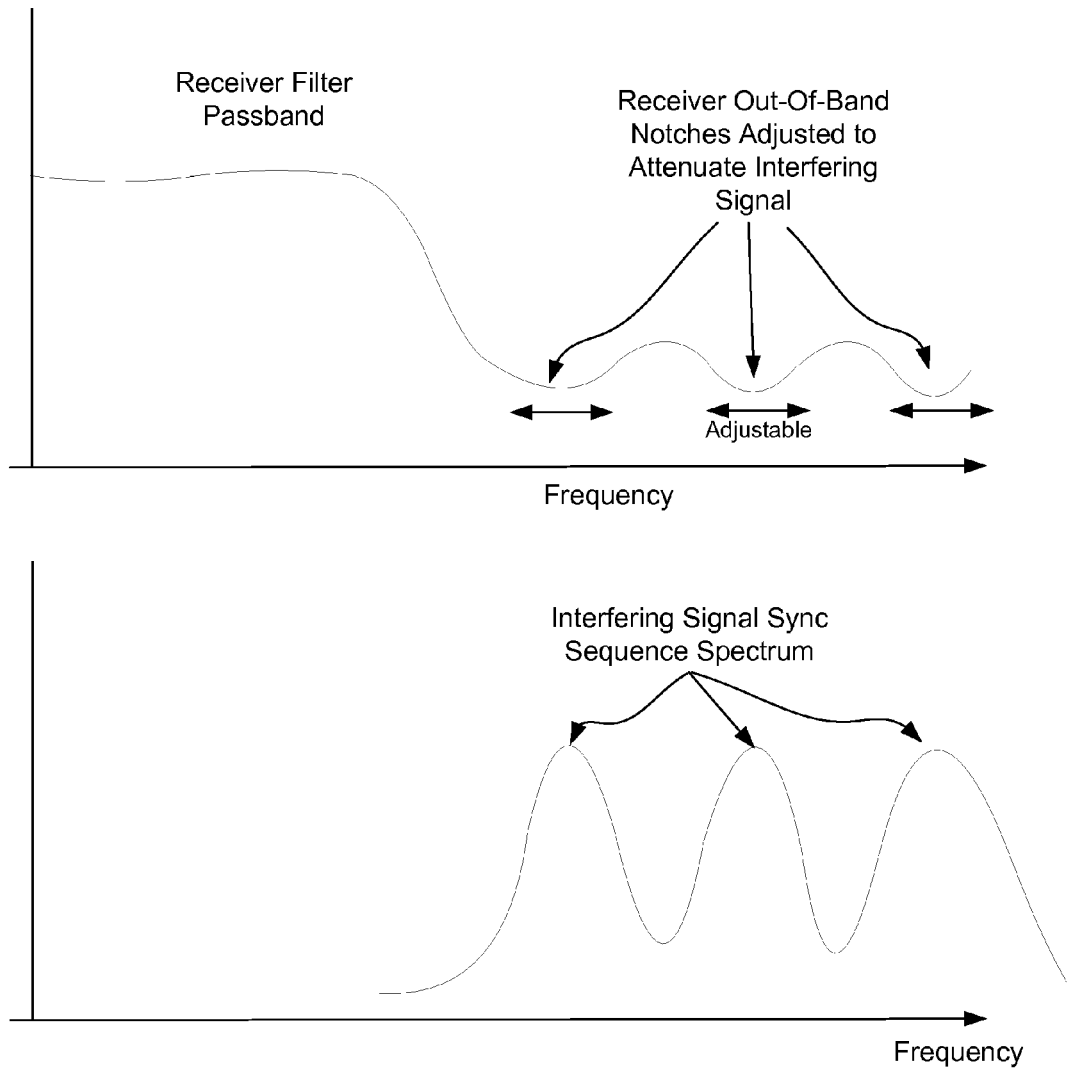
FIG. 5 shows an example of a frequency response of a receiver filter, and shows peaks and valleys within the frequency response that can be adjusted based on information (frequency components synchronization sequence) of an interfering signal.

FIG. 5 shows an example of a frequency response of a receiver filter, and shows peaks and valleys within the frequency response that can be adjusted based on information of an interfering signal. As shown, the valleys (notches) can be adjusted so that the notches of the out-of-band filter response align with the frequency components of the interfering signal.

Figure 6A:
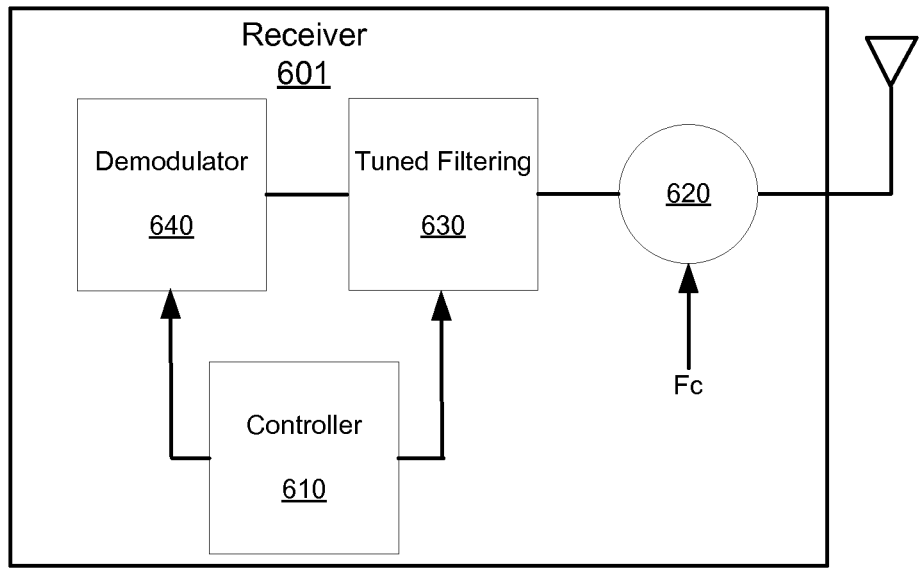
FIGS. 6A and 6B show an embodiment of a receiver that includes a filter with an adjustable frequency response, and an embodiment of a receiver that includes selectable receiver filters.
Figure 6B:
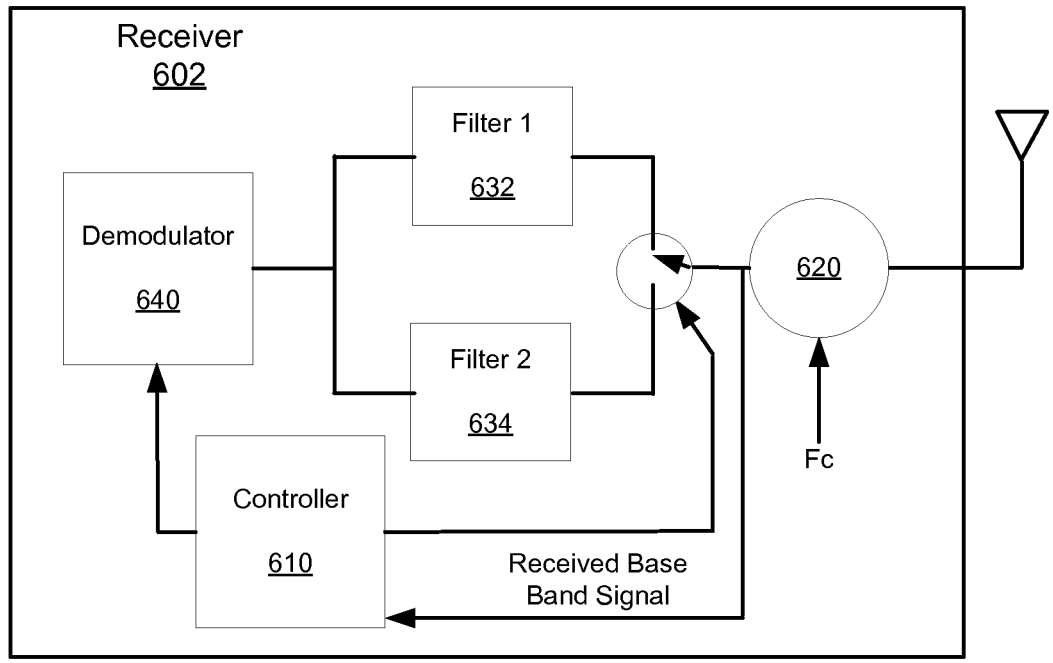

FIGS. 6A and 6B show an embodiment of a receiver that includes a filter with an adjustable frequency response, and an embodiment of a receiver that includes selectable receiver filters. The embodiment of FIG. 6A includes a tunable filter 630 for filtering the baseband receive signal which has been frequency down-converted through a mixer 620 and a carrier frequency Fc. A controller 610 can tune, for example, the location in frequency of peaks and valleys of the out-of-band frequency response of the tuned filtering 630. As described, the controller can obtain information a priori about the interfering signals, and therefore, tune the filtering 630 accordingly. A demodulator 640 demodulates the receive signal.

The embodiment of FIG. 6B includes selectable filters 632, 634 for filtering the baseband receive signal which has been frequency down-converted through the mixer 620 and a carrier frequency Fc. The controller 610 can select which of the filters 632, 634 filters the receive signal. As previously described, filtering can disperse the interfering signal, and therefore, reduce the likelihood of an adjacent channel signal receiver falsely synchronizing to the interfering signal. It should be understood that for embodiments, the criteria for optimization is different during preamble (that is, during synchronization) versus post-preamble (that is, transmission data) processing. The processing of the preamble places a premium on having high dispersion, whereas post-preamble processing places a premium on having best a SINR. The controller can time selection of the filters 632, 634 to increase the dispersion of the interfering signal during periods of synchronization. As described, the controller can obtain information a priori about the interfering signals, and therefore, select the filtering 632, 634 accordingly.

Figure 7:
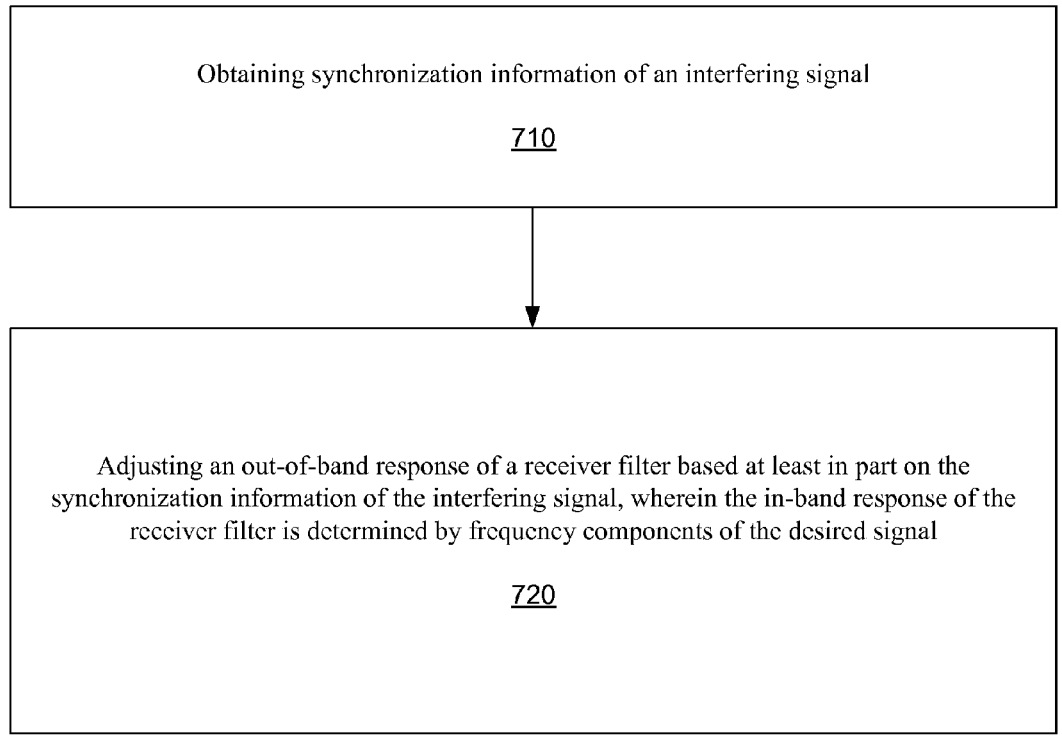
FIG. 7 is a flow chart that shows steps of a method of synchronizing a receiver to a desired signal according to embodiments.

FIG. 7 is a flow chart that shows steps of a method of synchronizing a receiver to a desired signal according to embodiments. A first step 710 includes obtaining synchronization information of an interfering signal. A second step 720 includes adjusting an out-of-band response of a receiver filter based at least in part on the synchronization information of the interfering signal, wherein an in-band response of the receiver filter is based on transmission characteristics of the desired signal. For this embodiment, the desired signal is a received signal, and the frequency components of the desired signal are known apriori. For embodiments, the transmission characteristics of the desired signal include the frequency spectrum occupied by the desired signal. Typically, this includes the desired signal adhering to a frequency spectrum mask.

For an embodiment, adjusting the out-of-band response includes adjusting frequency domain locations of peaks and valleys of the out-of-band response of the receiver filter based on a wireless channel response of the desired signal and a wireless channel response of the interfering signal. More specifically, an embodiment includes adjusting the out-of-band response comprises adjusting frequency domain locations of peaks and valleys of the out-of-band response of the receiver filter based on the synchronization information. That is, the peaks and valleys are aligned with the frequency locations of the synchronization information of the interfering signal. Alternatively stated, the valleys of the out-of-band response of the receiver filter are adjusted to align within frequency tones of a spectrum of the synchronization sequence of the interfering signal thereby resulting in increased suppression of the interfering signal's synchronization sequence. Consequently, the aliasing component of the interfering signal following decimation at the receiver, is less likely to produce a correlation peak exceeding the threshold during synchronization of the desired signal.

An embodiment includes selecting the out-of-band filtering to include dispersion greater than a threshold, wherein the threshold is determined based at least in part on the synchronization information of the interfering signal. That is, the dispersion of the interfering signal is increased. A more specific embodiment includes selecting the out-of-band filtering to include greater dispersion during a synchronization period of the signal than during non-synchronization periods of the signal. For an embodiment, the receiver filter includes at least two selections, wherein a first selection provides greater dispersion of the interfering signal than a second selection, and the first selection is selected during the synchronization period of the interfering signal.

An embodiment includes determining an interference noise ratio (INR) target of the desired signal, and adjusting the receiver filter to achieve the INR target. A specific embodiment for adjusting the receiver filter to achieve the INR target includes determining a portion of an adjacent channel spectrum corresponding to a frequency content of a synchronization sequence of an adjacent channel interferer, estimating a thermal noise variance at the receiver, determining a required signal level of the synchronization sequence of the adjacent channel interferer relative to thermal noise that reduces false sync probability below a desired threshold, $p_{int\_sync}$, estimating a desired minimum distance of the adjacent channel interferer from the receiver at which interference immunity is desired, determining the received interference signal power at the receiver using knowledge of transmit power of the adjacent channel interferer and an approximation of a path loss based on a line-of-sight (LOS) assumption between the adjacent channel interferer and the receiver, estimating adjacent channel signal suppression achieved by the receiver filter, and utilizing a least squares filter configuration to ensure rejection of the receiver filter to satisfy the INR target. This embodiment is described in greater detail in connection with FIG. 11.

For an alternate embodiment, the step of estimating a desired minimum distance of the adjacent channel interferer from the receiver at which interference immunity is desired, and the step of determining the received interference signal power at the receiver using knowledge of transmit power of the adjacent channel interferer and an approximation of a path loss based on a line-of-sight (LOS) assumption between the adjacent channel interferer and the receiver can alternatively be replaced with setting a target interference received power level that will achieve the false sync probability noted above.

Figure 8:
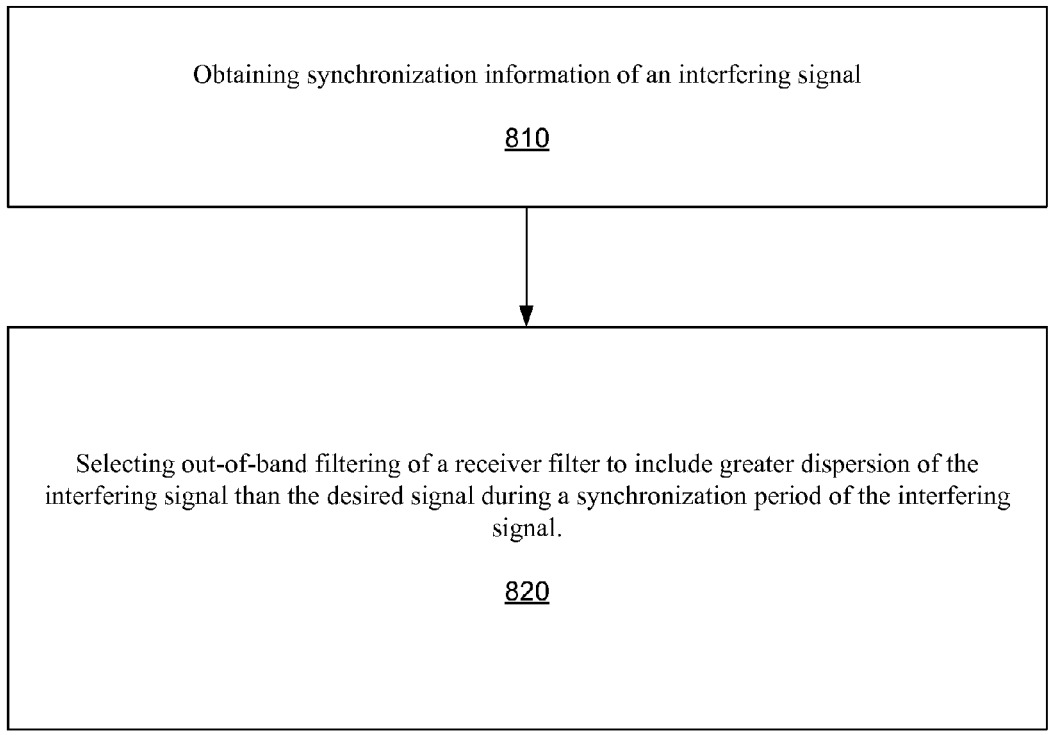
FIG. 8 is a flow chart that shows steps of another method of synchronizing a receiver to a desired signal according to embodiments.

FIG. 8 is a flow chart that shows steps of another method of synchronizing a receiver to a desired signal according to embodiments. A first step 810 includes obtaining synchronization information of an interfering signal. A second step 820 includes selecting out-of-band filtering of a receiver filter to include greater dispersion of the interfering signal than the desired signal during a synchronization period of the interfering signal.

For an embodiment, the receiver filter includes at least two selections, wherein a first selecting provides greater dispersion of the interfering signal than a second selection, and the first selection is selected during the synchronization period of the interfering signal.

An embodiment further includes adjusting an out-of-band response of a receiver filter based at least in part on the synchronization information of the interfering signal. More specifically, an embodiment includes adjusting an out-ofband response of a receiver filter based on a wireless channel response of the desired signal and a wireless channel response of the interfering signal. More specifically, an embodiment includes adjusting the out-of-band response comprises adjusting frequency domain locations of peaks and valleys of the out-of-band response of the receiver filter based on the synchronization information. More specifically, an embodiment includes adjusting the valleys of the out-of-band response of the receiver filter to align with frequency tones of a spectrum of the synchronization sequence of the interfering signal.

An embodiment includes selecting a target dispersion to achieve a desired false sync probability target, and selecting out-of-band filtering of the receiver filter to provide the target dispersion. A specific embodiment for selecting out-of-band filtering of the receiver filter to provide the target dispersion includes estimating a power delay profile of an interference channel as observed at baseband of the receiver based on a priori knowledge or by past reception of interference signal packets, identifying a peak of the power delay profile and computing a percent power at the peak relative to a whole power delay profile, and selecting out-of-band filtering of the receiver filter including determining a target group delay for the out-of-band spectrum, based on the percent peak power, which achieves the target dispersion. This embodiment is described in greater detail in connection with FIG. 12.

Figure 9:
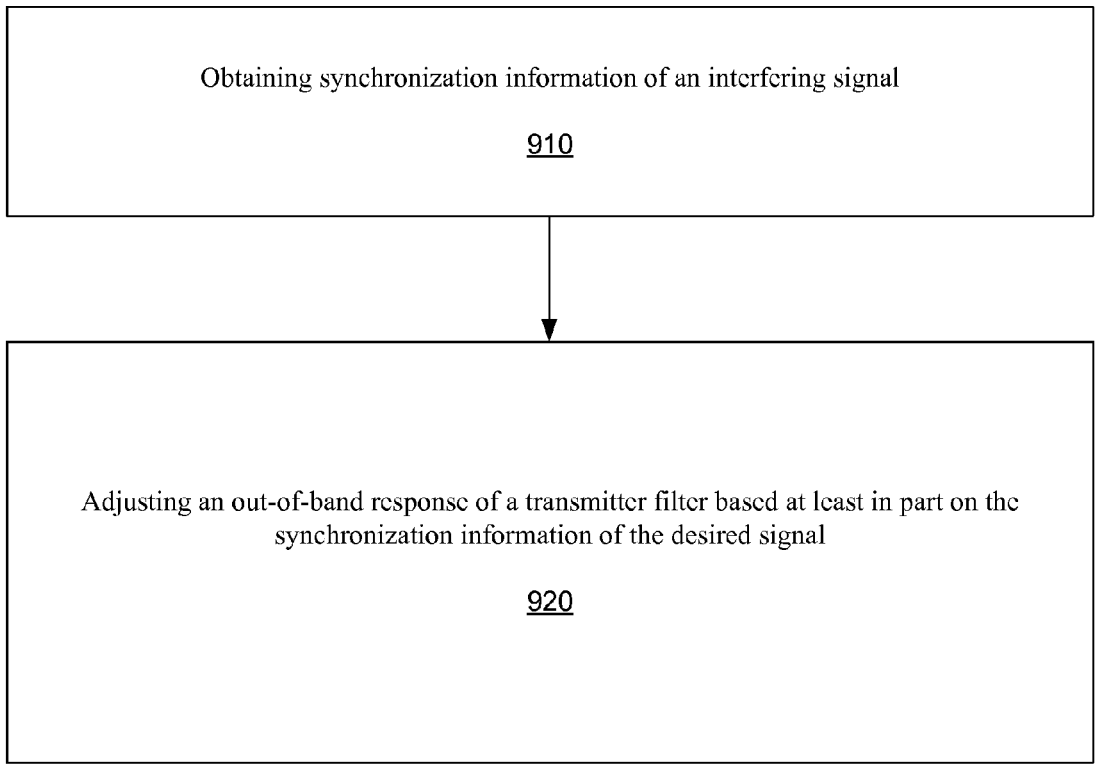
FIG. 9 is a flow chart that shows steps of a method of a transmitter mitigating its interference of a desired signal according to embodiments.

FIG. 9 is a flow chart that shows steps of a method of a transmitter mitigating its interference of a desired signal according to embodiments. A first step 910 includes obtaining synchronization information of the desired signal. A second step 920 includes adjusting an out-of-band response of a transmitter filter based at least in part on the synchronization information of the desired signal.

For an embodiment, adjusting the out-of-band response comprises adjusting frequency domain locations of peaks and valleys of the out-of-band response of the transmitter filter based on a wireless channel response of the desired signal and a wireless channel response of an interfering signal, wherein the transmitter transmits the interfering signal.

Figure 10A:
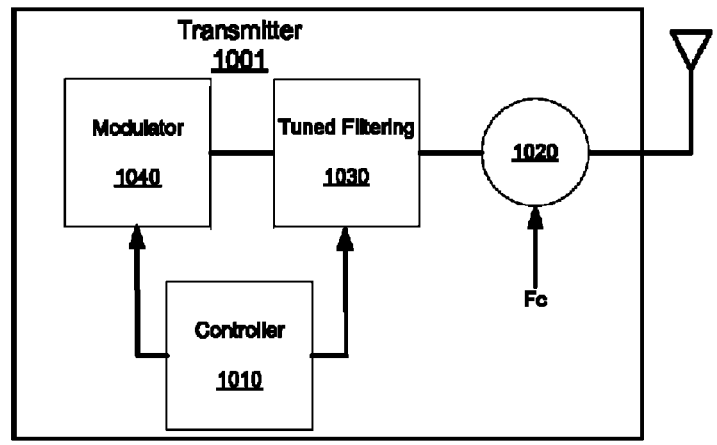
FIGS. 10A and 10B shows embodiments of a transmitter that that includes a filter with an adjustable frequency response, and an embodiment of a receiver that includes selectable receiver filters.
Figure 10B:
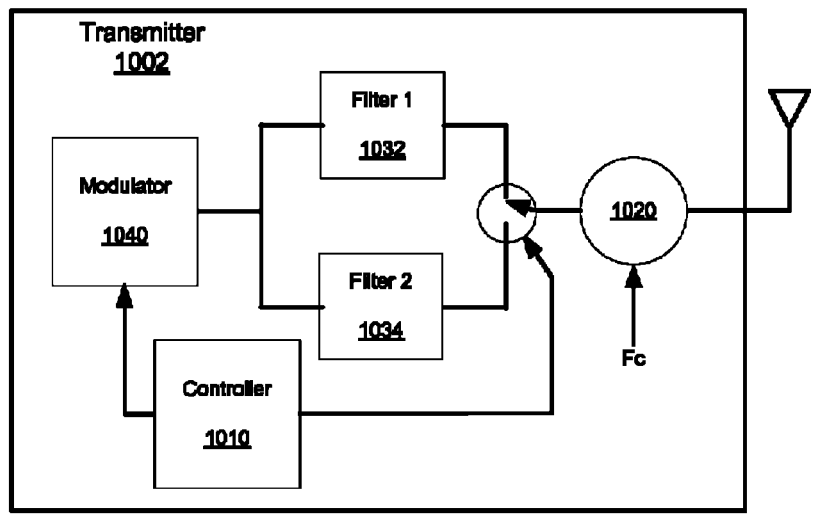

FIGS. 10A and 10B shows embodiments of a transmitter that that includes a filter with an adjustable frequency response, and an embodiment of a transmitter that includes selectable receiver filters. These embodiment provide mitigation of interference into receivers that occupy adjacent channels (or nearby in frequency) signals. More specifically, these embodiments reduce the likelihood of an adjacent channel signal receiver falsely synchronizing to the transmitter signal.

The embodiment of FIG. 10A includes a tunable filter 1030 for filtering the baseband transmit signal which is then frequency up-converted through a mixer 1020 and a carrier frequency Fc. A controller 1010 can tune, for example, the location in frequency of peaks and valleys of the out-of-band frequency response of the tuned filtering 1030. As described, the controller can obtain information a priori about the other (desired) signals, and therefore, tune the filtering 1030 accordingly. A modulator 1040 modulates the transmit signal.

The embodiment of FIG. 10B includes selectable filters 1032, 1034 for filtering the baseband transmit signal which is then frequency up-converted through a mixer 1020 and a carrier frequency Fc. The controller 1010 can select which of the filters 1032, 1034 filters the transmit signal. As previously described, filtering can disperse the interfering signal, and therefore, reduce the likelihood of an adjacent channel signal receiver falsely synchronizing to the interfering signal. The controller can time selection of the filters 1032, 1034 to increase the dispersion of the interfering signal during periods of synchronization.

Figure 11:
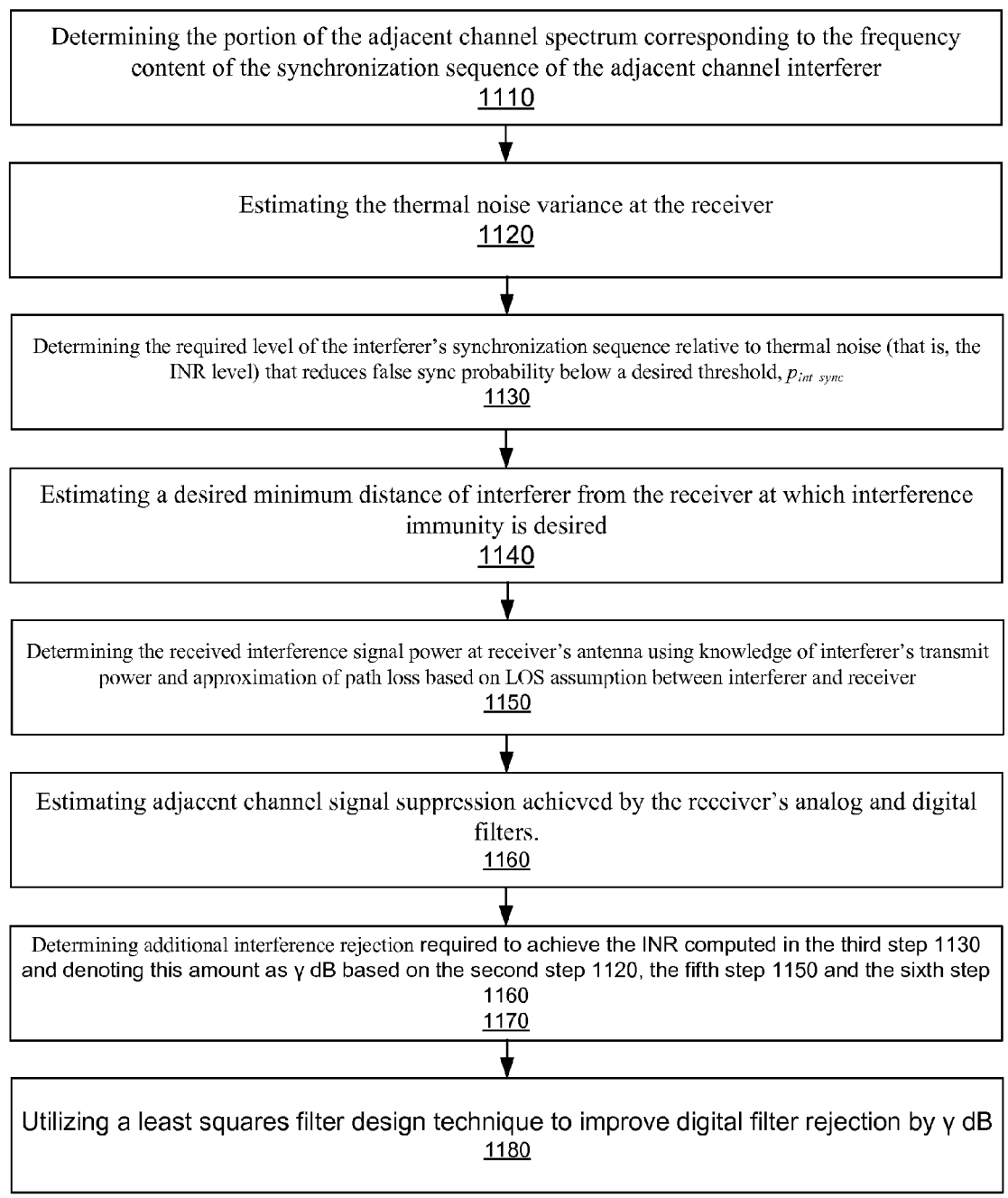
FIG. 11 is a flow chart that includes steps of an example of a method of tuning a receiver (or transmitter of the interferer) filter to suppress synchronization frequency components of an interfering signal.

FIG. 11 is a flow chart that includes steps of an example of a method of tuning a receiver (or transmitter of the interferer) filter to suppress synchronization frequency components of an interfering signal. The result is a lower INR of the received signal during the synchronization portion of the preamble of the interfering signal (which results in a lower false synchronization rate to the interferer). A first step 1110 includes determining the portion of the adjacent channel spectrum corresponding to the frequency content of the synchronization sequence of the adjacent channel interferer. A second step 1120 includes estimating the thermal noise variance at the receiver. A third step 1130 includes determining the required level of the interferer's synchronization sequence relative to thermal noise (that is, the INR level) that reduces false sync probability below a desired threshold, $p_{int\_sync}$. A fourth step 1140 includes estimating a desired minimum distance of interferer from the receiver at which interference immunity (that is, no susceptibility to false sync) is desired. A fifth step 1150 includes determining the received interference signal power at receiver's antenna using knowledge of interferer's transmit power and approximation of path loss based on LOS assumption between interferer and receiver. A sixth step 1160 includes estimating adjacent channel signal suppression achieved by receiver's analog and digital filters. A seventh step 1170 includes determining additional interference rejection required to achieve the INR computed in the third step 1130 and denoting this amount as $\gamma$ dB based on the second step 1120, the fifth step 1150 and the sixth step 1160. An eighth step 1090 includes utilizing a least squares filter design technique to improve digital filter rejection by $\gamma$ dB. Specifically, lower the maximum allowable out of band frequency response in spectrum corresponding to that determined in the first step 1110 by $\gamma$ dB. If necessary, increase the maximum allowable out of band frequency response in the spectrum not corresponding to that determined in the first step 1110. That is, where there is no sync sequence frequency content—in order to achieve the increased $\gamma$ dB rejection in the desired portions of the out of band frequency spectrum. It should be noted that typically, in filter design, the out of band response has ripple commonly referred to as stop band ripple that results from having a sharp desired transition in rejection from pass-band to stop-band. In essence, this approach is allowing for larger ripple thereby increasing the search space with the restriction that the valleys of the ripple coincide with the synchronization sequence frequency components of the interfering signal.

Figure 12:
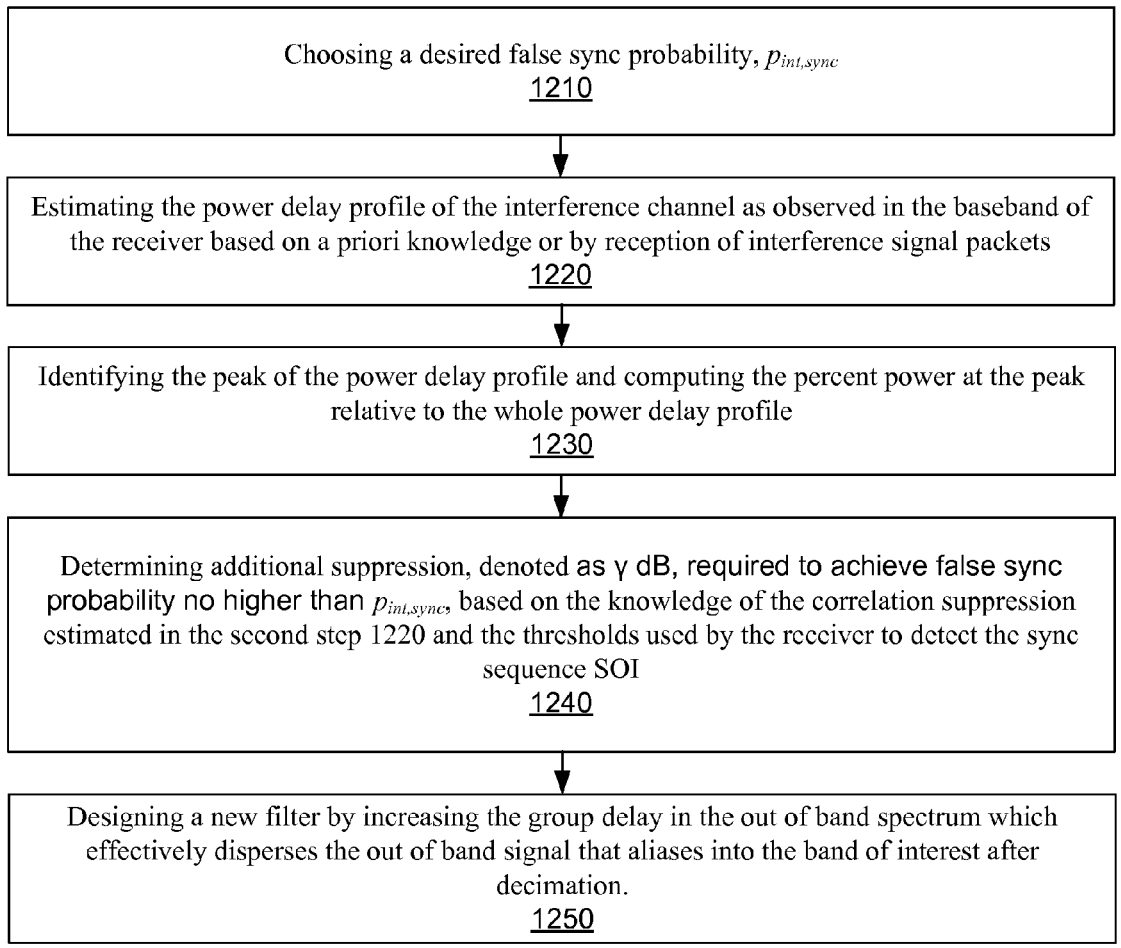
FIG. 12 is a flow chart that includes steps of an example of a method of providing a filter that provides an increase the dispersion of the synchronization components of the interfering signal received by the receiver.

FIG. 12 is a flow chart that includes steps of an example of a method of providing a filter that provides an increase the dispersion of the synchronization components of the interfering signal received by the receiver. The increased dispersion results in the reduction of the correlation peak during synchronization which reduces the likelihood of false synchronization. A first step 1210 includes choosing a desired false sync probability, $p_{int,sync}$. A second step 1220 includes estimating the power delay profile of the interference channel as observed in the baseband of the receiver based on a priori knowledge or by reception of interference signal packets. A third step 1230 includes identifying the peak of the power delay profile and computing the percent power at the peak relative to the whole power delay profile. This percent effectively quantifies the suppression of the sync sequence autocorrelation peak causes by the combined channel response. A fourth step 1240 includes determining additional suppression (defined as reduction of the peak energy of any one tap in the power delay profile), denoted as $\gamma$ dB, required to achieve false sync probability no higher than $p_{int,sync}$, based on the knowledge of the correlation suppression estimated in the second step 1220 and the thresholds used by the receiver to detect the sync sequence SOI. A fifth step 1250 includes designing a new filter by increasing the group delay in the out of band spectrum which effectively disperses the out of band signal that aliases into the band of interest after decimation. The group delay should be adjusted until an increased dispersion of γ dB is achieved as defined in the fourth step 1240. The filter design should constrain the in-band response to not substantially increase the in-band group delay (which would increase the likelihood of miss detection of desired signal).

Although specific embodiments have been described and illustrated, the embodiments are not to be limited to the specific forms or arrangements of parts so described and illustrated.

What is claimed:

1. A method of synchronizing a receiver to a desired signal, comprising:
   obtaining synchronization information of an interfering signal, wherein the synchronization information includes a synchronization sequence of the interfering signal;
   adjusting an out-of-band response of a receiver filter based at least in part on a spectrum of the synchronization sequence of the interfering signal, comprising adjusting frequency domain locations of peaks and valleys of the out-of-band response of the receiver filter, wherein the valleys of the out-of-band response of the receiver filter are adjusted to align with frequency tones of the spectrum of the synchronization sequence of the interfering signal, wherein an in-band response of the receiver filter is based on transmission characteristics of the desired signal.

2. The method of claim 1, wherein the valleys of the out-of-band response include notches, and wherein adjusting the peaks and valleys of the out-of-band response of the receiver filter based on the synchronization information comprises aligning the notches of the out-of-band response with frequency components of the interfering signal.

3. A receiver, comprising:
   a controller, the controller obtaining synchronization information of an interfering signal, wherein the synchronization information includes a synchronization sequence of the interfering signal;
   a front-end receiver chain comprising a receiver filter, wherein the controller and the front-end receiver chain are operative to adjust an out-of-band response of a receiver filter based at least in part on a spectrum of the synchronization sequence of the interfering signal, wherein adjusting the out-of-band response of the receiver filter comprising adjusting frequency domain locations of peaks and valleys of the out-of-band response of the receiver filter, wherein the valleys of the out-of-band response of the receiver filter are adjusted to align with frequency tones of the spectrum of the synchronization sequence of the interfering signal, wherein an in-band response of the receiver filter is based on transmission characteristics of a desired signal.

4. The receiver of claim 3, wherein the valleys of the out-of-band response include notches, and wherein adjusting the peaks and valleys of the out-of-band response of the receiver filter based on the synchronization information comprises aligning the notches with frequency components of the interfering signal.

5. A method of synchronizing a receiver to a desired signal, comprising:
   obtaining synchronization information of an interfering signal, wherein the synchronization information includes a spectrum of a synchronization portion of the interfering signal;
   adjusting an out-of-band response of a receiver filter based at least in part on the spectrum, wherein the adjusting of the out-of-band response of the receiver filter provides attenuation of at least some frequency tones of the spectrum, wherein adjusting the out-of-band response of the receiver filter comprising adjusting frequency domain locations of peaks and valleys of the out-of-band response of the receiver filter, wherein the valleys of the out-of-band response of the receiver filter are adjusted to align with the at least some frequency tones of the spectrum of the synchronization portion of the interfering signal, wherein an in-band response of the receiver filter is based on transmission characteristics of the desired signal.

6. A method of synchronizing a receiver to a desired signal, comprising:
   obtaining synchronization information of an interfering signal, wherein the synchronization information includes a synchronization sequence of the interfering signal;
   adjusting an out-of-band response of a receiver filter based at least in part on the synchronization information of the interfering signal, wherein the out-of-band response of the receiver filter is adjusted to filter frequency tones of a spectrum of the synchronization sequence of the interfering signal, wherein adjusting the out-of-band response of the receiver filter comprising adjusting frequency domain locations of peaks and valleys of the out-of-band response of the receiver filter, wherein the valleys of the out-of-band response of the receiver filter are adjusted to align with the frequency tones of the spectrum of the synchronization sequence of the interfering signal and wherein an in-band response of the receiver filter is based on transmission characteristics of the desired signal.

* * * * *